(12) United States Patent
Wu (10) Patent No.: US 9,996,116 B2
(45) Date of Patent: Jun. 12, 2018

(54) HINGE MECHANISM AND PORTABLE ELECTRONIC DEVICE THEREOF

(71) Applicant: Wistron Corporation, New Taipei (TW)

(72) Inventor: Peng Wu, New Taipei (TW)

(73) Assignee: Wistron Corporation, New Taipei (TW)

( * ) Notice: Subject to any disclaimer, the term of this patent is extended or adjusted under 35 U.S.C. 154(b) by 74 days.

(21) Appl. No.: 15/358,080

(22) Filed: Nov. 21, 2016

(65) Prior Publication Data

US 2018/0101201 A1    Apr. 12, 2018

(30) Foreign Application Priority Data

Oct. 11, 2016 (CN) .......................... 2016 1 0887288

(51) Int. Cl.
*E05D 11/10* (2006.01)
*G06F 1/16* (2006.01)
*E05D 3/04* (2006.01)
*E05D 11/06* (2006.01)

(52) U.S. Cl.
CPC ............ *G06F 1/1681* (2013.01); *E05D 3/04* (2013.01); *E05D 11/06* (2013.01); *E05D 11/10* (2013.01); *E05D 11/1078* (2013.01); *G06F 1/1616* (2013.01)

(58) Field of Classification Search
CPC .......... E05D 3/04; E05D 11/06; E05D 11/10; E05D 11/1028; E05D 11/1042; E05D 11/1078; E05D 2011/1035; G06F 1/1616; G06F 1/1681

USPC .................................................. 16/319, 348
See application file for complete search history.

(56) References Cited

U.S. PATENT DOCUMENTS

| 7,146,684 | B2 * | 12/2006 | Hirtsiefer | .............. | E05C 17/345 |
| | | | | | 16/339 |
| 7,584,524 | B2 * | 9/2009 | Hung | .................... | G06F 1/1632 |
| | | | | | 16/319 |
| 8,590,107 | B2 * | 11/2013 | Omann | ................. | E05D 15/401 |
| | | | | | 16/319 |
| 8,899,537 | B2 * | 12/2014 | Kuan | ................. | F16M 11/2021 |
| | | | | | 16/319 |
| 2011/0297196 | A1 * | 12/2011 | Durante | ................. | A45B 17/00 |
| | | | | | 135/15.1 |

* cited by examiner

*Primary Examiner* — Roberta S Delisle
(74) *Attorney, Agent, or Firm* — Winston Hsu (57) ABSTRACT

A hinge mechanism includes a shaft, a first connecting member pivoted to the shaft and connected to a first body, a second connecting member fixed to the shaft and connected to a second body, a limiting frame, a rail base, a pin movably disposed through a slot of the limiting frame, and an elastic member connected to the pin and abutting against the first connecting member for driving the pin against the rail base. The limiting frame is fixed to the first connecting body and pivoted to the shaft. The rail base is fixed to the shaft and has first, second, third arc-shaped rails and a transition rail. When the first body rotates an expanding angle relative to the second body in a first rotating direction, the pin moves along the first arc-shaped rail to the transition rail and abuts against a first stopping end surface of the transition rail.

12 Claims, 11 Drawing Sheets

HINGE MECHANISM AND PORTABLE ELECTRONIC DEVICE THEREOF

BACKGROUND OF THE INVENTION

1. Field of the Invention

The present invention relates to a hinge mechanism and a portable electronic device thereof, and more specifically, to a hinge mechanism applied to pivotal connection between a display monitor and a system host so as to make the display monitor capable of rotating a large angle relative to the system host and a portable electronic device thereof.

2. Description of the Prior Art

In general, a notebook or a foldable electronic product adopts a pivot design that a hinge mechanism is rotatably connected to a display monitor and a system host, so as to make the display monitor capable of rotating to cover the system host (for a user to place or carry it conveniently) or rotating an expanding angle (e.g. 120°) relative to the system host for operational convenience. Further, the notebook could utilize a special hinge mechanism to make the display monitor having a touch function capable of rotating about 360° to be stacked under the system host, so as to switch the notebook to a tablet mode. In practical application, the aforesaid hinge mechanism could provide a sufficient torque by a friction force generated from rotation of a connecting member on a shaft of the hinge mechanism, so that the user could rotate the display monitor to be positioned at any desired angle. Moreover, the torque provided by the hinge mechanism could efficiently prevent the display monitor from closing suddenly to cause damage of the display monitor and the system host.

However, since the torque provided by the hinge mechanism could only make the display monitor stop at a desired expanding angle relative to the system host, the display monitor may be flipped when the user exerts an excessive pressing force on the display monitor to perform the touch operation. Thus, it may cause the user much inconvenience in operating the notebook or the foldable electronic product.

SUMMARY OF THE INVENTION

The present invention provides a hinge mechanism applied to pivot connection between a first body and a second body. The first body rotates to a first position to be stacked on the second body or to a second position to form an expanding angle cooperatively with the second body via the hinge mechanism. The hinge mechanism includes a shaft, a first connecting member, a second connecting member, a limiting frame, a rail base, a pin, and an elastic member. The first connecting member is fixed to the first body. The first connecting member rotatably sleeves the shaft. The second connecting member is fixed to the second body and non-rotatably fixed to the shaft. The limiting frame is fixed to the first connecting member. The limiting frame rotatably sleeves the shaft. A slot is formed on the limiting frame. The rail base is non-rotatably fixed to the shaft adjacent to the limiting frame. The rail base has a first arc-shaped rail, a transition rail, a second arc-shaped rail, and a third arc-shaped rail communicated with each other. An end of the first arc-shaped rail is communicated with the transition rail. Another end of the first arc-shaped rail is communicated with the second arc-shaped rail and the third arc-shaped rail respectively. The transition rail is communicated with the second arc-shaped rail and the third arc-shaped rail respectively. A first stopping step structure is formed at a position where the transition rail is communicated with the first arc-shaped rail. The pin is movably disposed through the slot. An end of the pin moves in the first arc-shaped rail, the transition rail, the second arc-shaped rail, or the third arc-shaped rail when the limiting frame rotates relative to the rail base. The elastic member is connected to the pin. The elastic member abuts against the first connecting member for providing an elastic force to keep the end of the pin abutting against the first arc-shaped rail, the transition rail, the second arc-shaped rail, or the third arc-shaped rail when the end of the pin moves. When the first body rotates the expanding angle from the first position to the second position in a first rotating direction, the pin moves to the transition rail along the first arc-shaped rail and abuts against a first stopping end surface of the transition rail. When the first body rotates an operating angle from the second position to a third position in a second rotating direction opposite to the first rotating direction, the pin moves toward the second arc-shaped rail along the first stopping step structure. When the first body rotates from the third position in the first rotating direction, the pin moves to the second arc-shaped rail along the transition rail. When the first body rotates back to the first position in the second rotation direction to be stacked on the second body, the pin moves from the second arc-shaped rail back to the first arc-shaped rail through the third arc-shaped rail.

The present further provides a portable electronic device including a first body, a second body, and a hinge mechanism. The hinge mechanism is pivoted to the first body and the second body, for making the first body rotate to a first position to be stacked on the second body or to a second position to form an expanding angle cooperatively with the second body. The hinge mechanism includes a shaft, a first connecting member, a second connecting member, a limiting frame, a rail base, a pin, and an elastic member. The first connecting member is fixed to the first body. The first connecting member rotatably sleeves the shaft. The second connecting member is fixed to the second body and non-rotatably fixed to the shaft. The limiting frame is fixed to the first connecting member. The limiting frame rotatably sleeves the shaft. A slot is formed on the limiting frame. The rail base is non-rotatably fixed to the shaft adjacent to the limiting frame. The rail base has a first arc-shaped rail, a transition rail, a second arc-shaped rail, and a third arc-shaped rail communicated with each other. An end of the first arc-shaped rail is communicated with the transition rail. Another end of the first arc-shaped rail is communicated with the second arc-shaped rail and the third arc-shaped rail respectively. The transition rail is communicated with the second arc-shaped rail and the third arc-shaped rail respectively. A first stopping step structure is formed at a position where the transition rail is communicated with the first arc-shaped rail. The pin is movably disposed through the slot. An end of the pin moves in the first arc-shaped rail, the transition rail, the second arc-shaped rail, or the third arc-shaped rail when the limiting frame rotates relative to the rail base. The elastic member is connected to the pin. The elastic member abuts against the first connecting member for providing an elastic force to keep the end of the pin abutting against the first arc-shaped rail, the transition rail, the second arc-shaped rail, or the third arc-shaped rail when the end of the pin moves. When the first body rotates the expanding angle from the first position to the second position in a first rotating direction, the pin moves to the transition rail along the first arc-shaped rail and abuts against a first stopping end surface of the transition rail. When the first body rotates an operating angle from the second position to a third position in a second rotating direction opposite to the first rotating direction, the pin moves toward the second arc-shaped rail along the first stopping step structure. When the first body rotates from the third position in the first rotating direction, the pin moves to the second arc-shaped rail along the transition rail. When the first body rotates back to the first position in the second rotation direction to be stacked on the second body, the pin moves from the second arc-shaped rail back to the first arc-shaped rail through the third arc-shaped rail.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
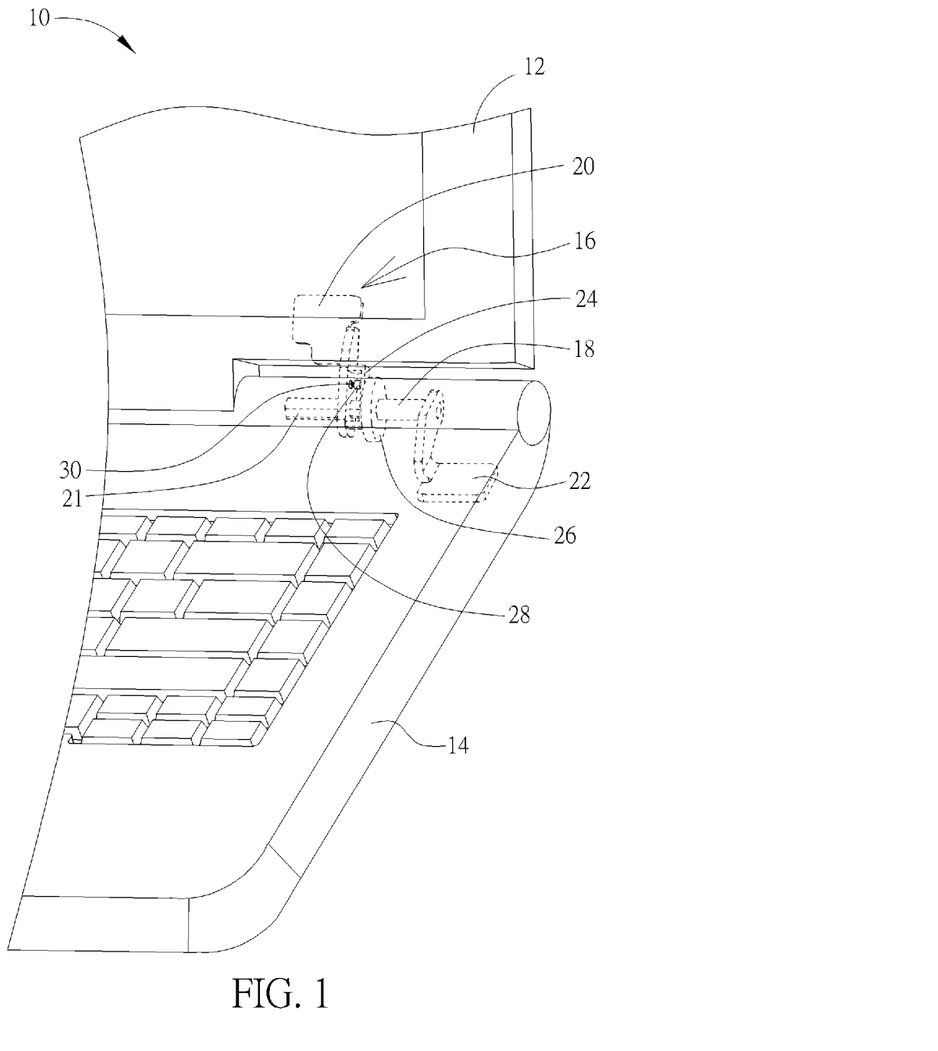
FIG. 1 is a partial enlarged diagram of a portable electronic device according to an embodiment of the present invention.

Please refer to FIG. 1, which is a partial enlarged diagram of a portable electronic device 10 according to an embodiment of the present invention. As shown in FIG. 1, the portable electronic device 10 includes a first body 12, a second body 14, and a hinge mechanism 16. The first body 12 is pivoted to the second body 14 via the hinge mechanism 16, so that the first body 12 could rotate to cover the second body 14 or expand relative to the second body 14. In this embodiment, the portable electronic device 10 could be preferably a notebook, the first body 12 could be preferably a display monitor, and the second body 14 could be preferably a system host (but not limited thereto).

Figure 2:
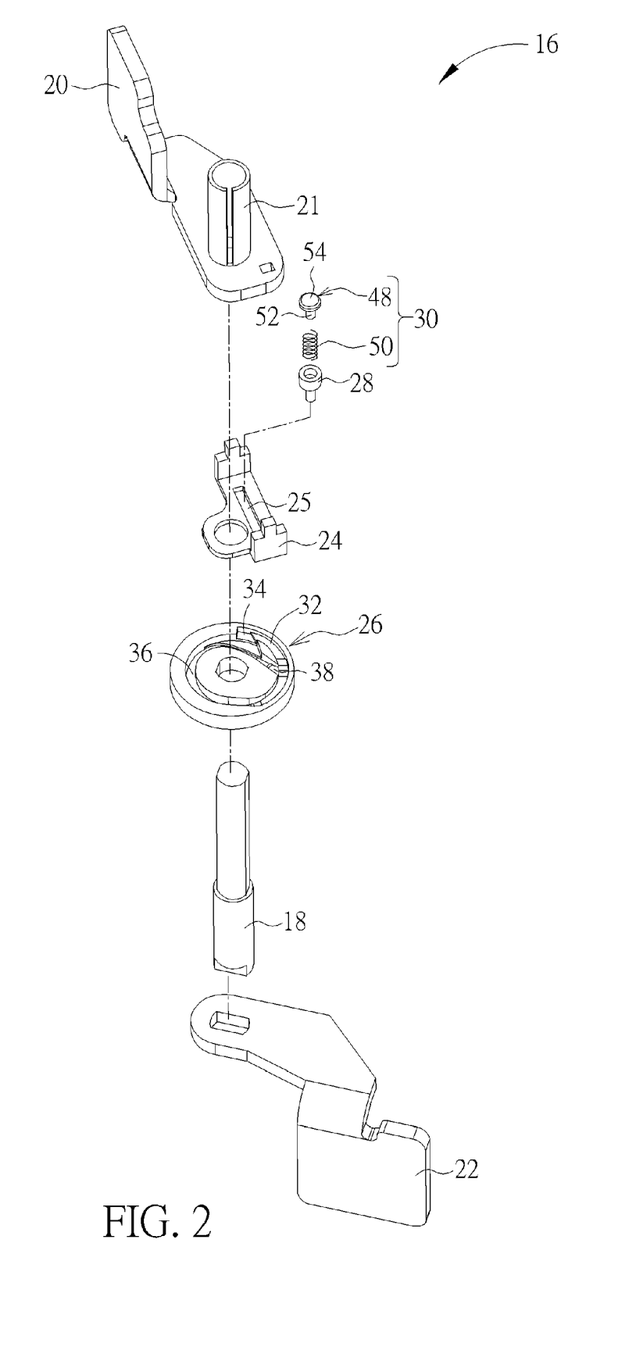
FIG. 2 is an exploded diagram of a hinge mechanism in FIG. 1.
Figure 3:
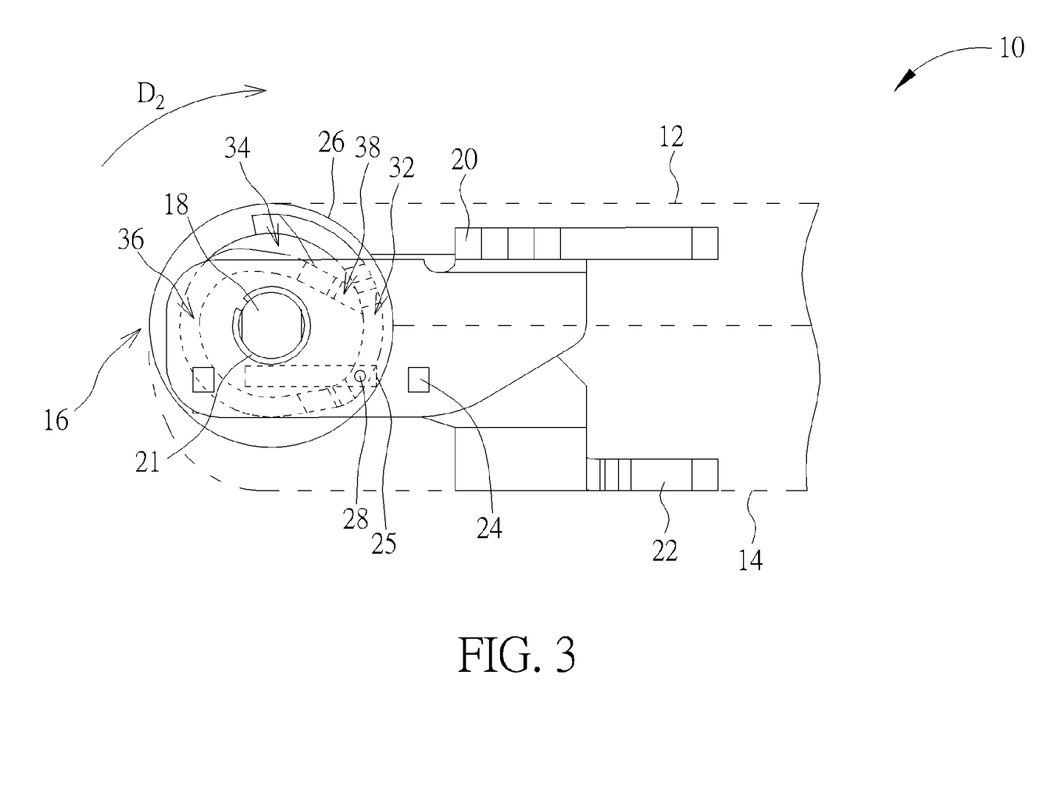
FIG. 3 is a side view of a first body in FIG. 1 being stacked on a second body 14.
Figure 4:
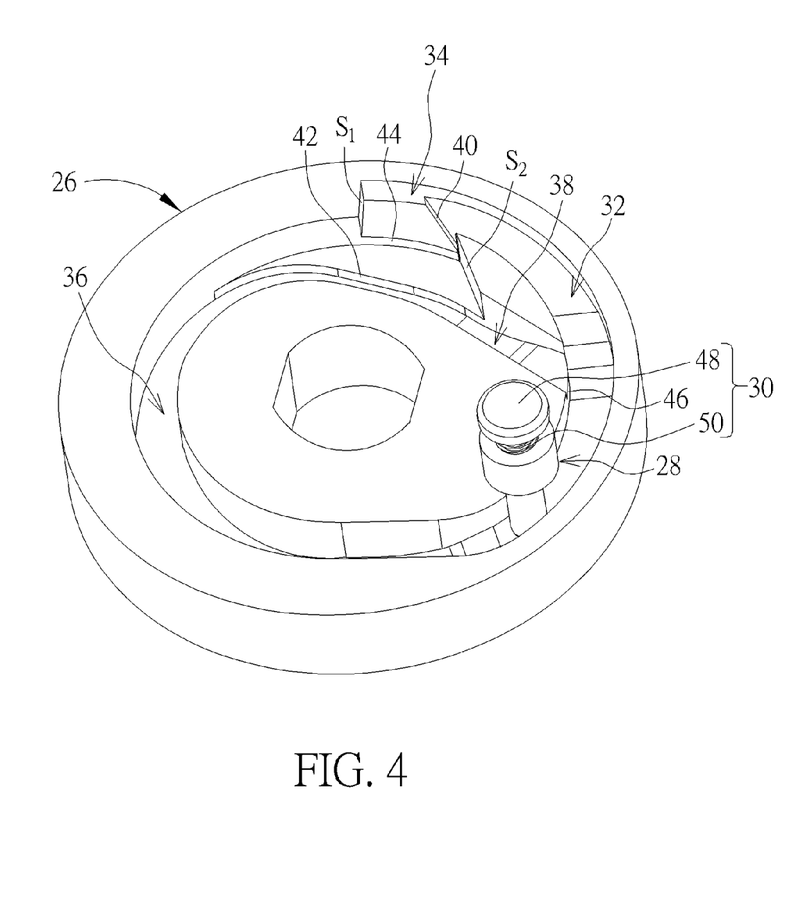
FIG. 4 is an enlarged diagram of a pin in FIG. 3 being located at a first arc-shaped rail of a rail base.

Please refer to FIG. 1, FIG. 2, FIG. 3, and FIG. 4. FIG. 2 is an exploded diagram of the hinge mechanism 16 in FIG. 1. FIG. 3 is a side view of the first body 12 in FIG. 1 being stacked on the second body 14. FIG. 4 is an enlarged diagram of a pin 28 in FIG. 3 being located at a first arc-shaped rail 32 of a rail base 26. For clearly showing movement of the pin 28 on the rail base 26, an elastic member 30 is omitted in FIG. 3 and the first body 12 and the second body 14 are briefly depicted by dotted lines in FIG. 3. As shown in FIG. 1, FIG. 2, FIG. 3, and FIG. 4, the hinge mechanism 16 includes a shaft 18, a first connecting member 20, a second connecting member 22, a limiting frame 24, the rail base 26, the pin 28, and the elastic member 30. The first connecting member 20 is fixed to the first body 12 and rotatably sleeves an end of the shaft 18 (e.g. by a sleeve 21), so that the first connecting member 20 could rotate relative to the shaft 18 and generate a corresponding torque. The second connecting member 22 is fixed to the second body 14 and another end of the shaft 18, so that the second connecting member 22 is unable to rotate relative to the shaft 18. Accordingly, the hinge mechanism 16 could utilize a friction force generated by rotation of the first connecting member 20 on the shaft 18 (but not limited thereto, meaning that the present invention could adopt other conventional hinge torque design in another embodiment, such as connecting a torsion spring to the first connecting member 20 and the shaft 18 for generating a torque, and the related description is omitted herein since it is commonly seen in the prior art) to provide a sufficient torque, so that a user could rotate the first body 12 relative to the second body 14 to any desired expanding angle.

The limiting frame 24 is fixed to the first connecting member 20 and rotatably sleeves the shaft 18. A slot 25 is formed on the limiting frame 24 for guiding movement of the pin 28. The rail base 26 is non-rotatably fixed to the shaft 18 adjacent to the limiting frame 24 and has the first arc-shaped rail 32, a transition rail 34, a second arc-shaped rail 36, and a third arc-shaped rail 38. An end of the first arc-shaped rail 32 is communicated with the transition rail 34, and another end of the first arc-shaped rail 32 is communicated with the second arc-shaped rail 36 and the third arc-shaped rail 38 respectively. The transition rail 34 is communicated with the second arc-shaped rail 36 and the third arc-shaped rail 38. A stopping step structure 40 is formed at a position where the transition rail 34 is communicated with the first arc-shaped rail 32, so as to prevent the pin 28 from moving back to the first arc-shaped rail 32 through the transition rail 34. In practical application, for surely preventing jamming of the pin 28 on the rail base 26, as shown in FIG. 4, a stopping step structure 42 is preferably formed at a position where the transition rail 34 is communicated with the second arc-shaped rail 36 and the third arc-shaped rail 38 for stopping the pin 28 from moving back to the transition rail 34 through the second arc-shaped rail 36 or the third arc-shaped rail 38. A stopping step structure 44 is preferably formed between a first stopping end surface $S_1$ and a second stopping end surface $S_2$ of the transition rail 34, so that the pin 28 could enter the second arc-shaped rail 36 along the stopping step structure 44. A stopping step structure 46 is preferably formed at a position where the third arc-shaped rail 38 is communicated with the first arc-shaped rail 32 for stopping the pin 28 from moving back to the third arc-shaped rail 38 through the first arc-shaped rail 32. It should be mentioned that the aforesaid step structural design could be selectively omitted for simplifying the rail structural design of the rail base 26.

The designs of the pin 28 and the elastic member 30 could be as shown in FIG. 2 and FIG. 4. The pin 28 is movably disposed through the slot 25, and when the limiting frame 24 rotates relative to the rail base 26, an end of the pin 28 moves in the first arc-shaped rail 32, the transition rail 34, the second arc-shaped rail 36, or the third arc-shaped rail 38. The elastic member 30 is connected to the pin 28 and abuts against the first connecting member 20. To be more specific, in this embodiment, the elastic member 30 could include an abutting pin 48 and a spring 50. The abutting pin 48 has a rod portion 52 and a head portion 54. The head portion 54 abuts against the first connecting member 20. The spring 50 sleeves the rod portion 52 and abuts against the head portion 54 and the pin 28 in a pre-pressed manner. Accordingly, the elastic member 30 could provide an elastic force to force the end of the pin 28 to abut against the first arc-shaped rail 32, the transition rail 34, the second arc-shaped rail 36, or the third arc-shaped rail 38 tightly, so as to surely prevent the pin 28 from falling out of the first arc-shaped rail 32, the transition rail 34, the second arc-shaped rail 36, or the third arc-shaped rail 38. In practical application, the head portion 54 of the abutting pin 48 is preferably in a semi-spherical shape (but not limited thereto), so as to keep the first connecting member 20 and the head portion 54 in a point-contact state. In such a manner, the friction force between the first connecting member 20 and the head portion 54 could be reduced for making sliding of the abutting pin 48 on the first connecting member 20 more smooth and steady.

Figure 5:
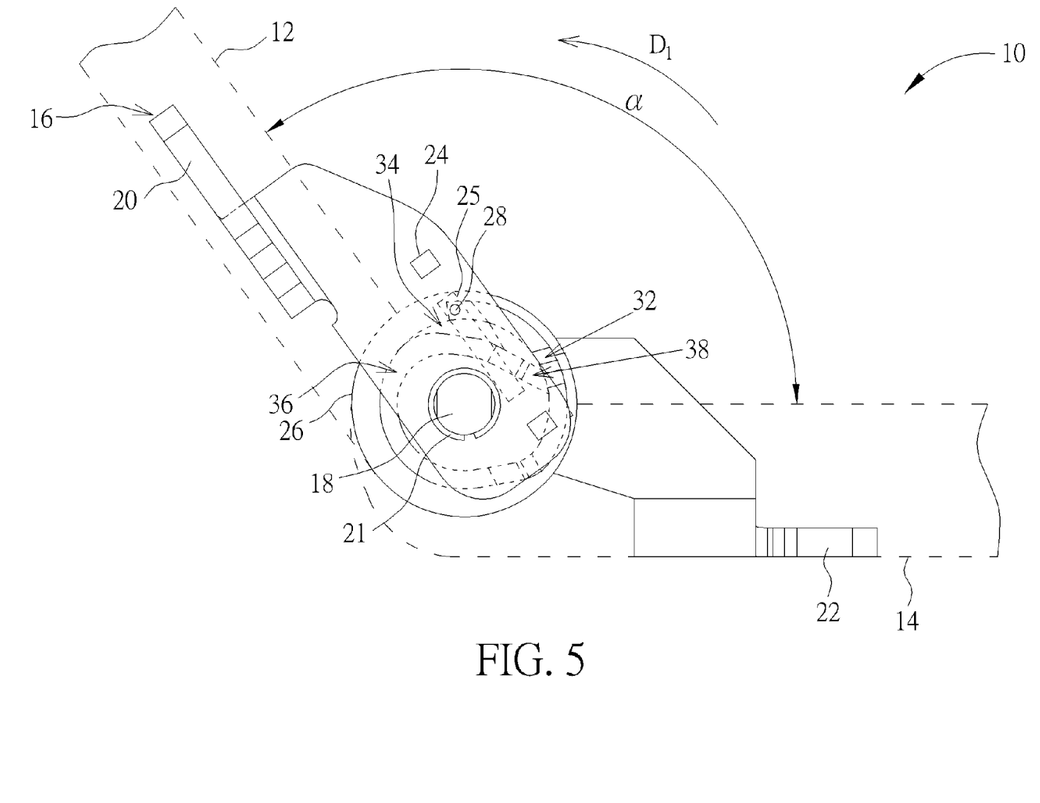
FIG. 5 is a side view of the first body in FIG. 3 rotating an expanding angle in a first rotating direction.
Figure 6:
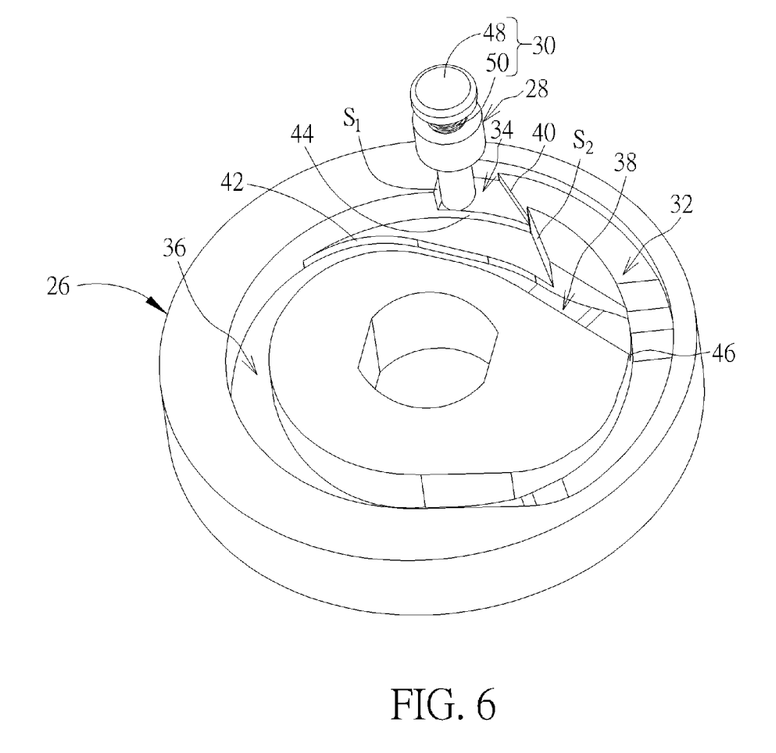
FIG. 6 is an enlarged diagram of the pin in FIG. 5 abutting against a first stopping end surface of a transition rail.

More detailed description for the expanding operation of the portable electronic device 10 is provided as follows. Please refer to FIG. 1, FIG. 3, FIG. 4, FIG. 5, and FIG. 6. FIG. 5 is a side view of the first body 12 in FIG. 3 rotating an expanding angle α in a first rotating direction $D_1$. FIG. 6 is an enlarged diagram of the pin 28 in FIG. 5 abutting against the first stopping end surface $S_1$ of the transition rail 32. When the user wants to expand the portable electronic device 10, the user just needs to rotate the first body 12 from a first position as shown in FIG. 3 to a second position as shown in FIG. 5 at the expanding angle α (e.g. 135°, but not limited thereto) in the first rotating direction $D_1$ (counterclockwise as shown in FIG. 5). In the aforesaid process, the first connecting member 20 rotates with the first body 12, and then drives the pin 28 via the limiting frame 24 from a position as shown in FIG. 3 to a position as shown in FIG. 5 along the first arc-shaped rail 32 to abut against the first stopping end surface $S_1$ of the transition rail 34 (at this time, as shown in FIG. 6, after the pin 28 crosses the stopping step structure 40, the spring 50 could provide the elastic force to drive the pin 28 to abut against the transition rail 34 tightly). In such a manner, via the stopping design that the first stopping end surface $S_1$ of the transition rail 34 abuts against the pin 28, the first body 12 could stay at the second position as shown in FIG. 1 steadily, so as to prevent the first body 12 from rotating during the user performs the related operation (e.g. a touch operation) on the first body 12. Accordingly, the present invention could efficiently solve the prior art problem that the display monitor may be flipped when the user exerts an excessive pressing force on the display monitor, so as to provide a preferable operation feeling to the user during operating the portable electronic device 10.

Figure 7:
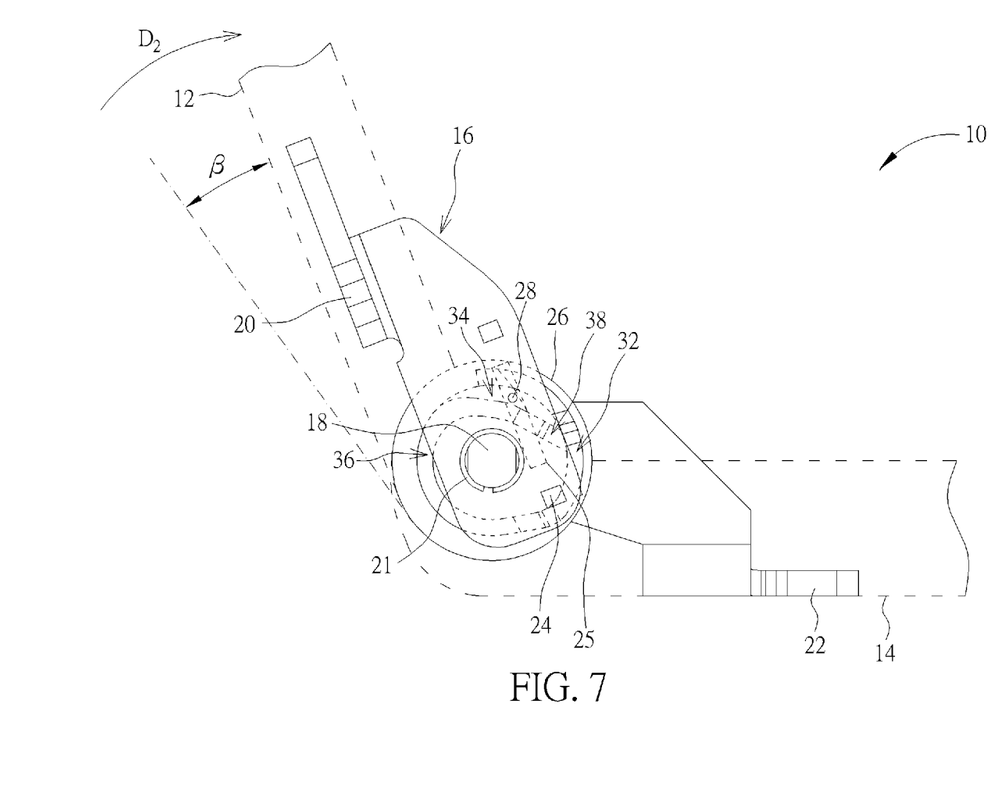
FIG. 7 is a side view of the first body in FIG. 5 rotating an operating angle in a second rotating direction.
Figure 8:
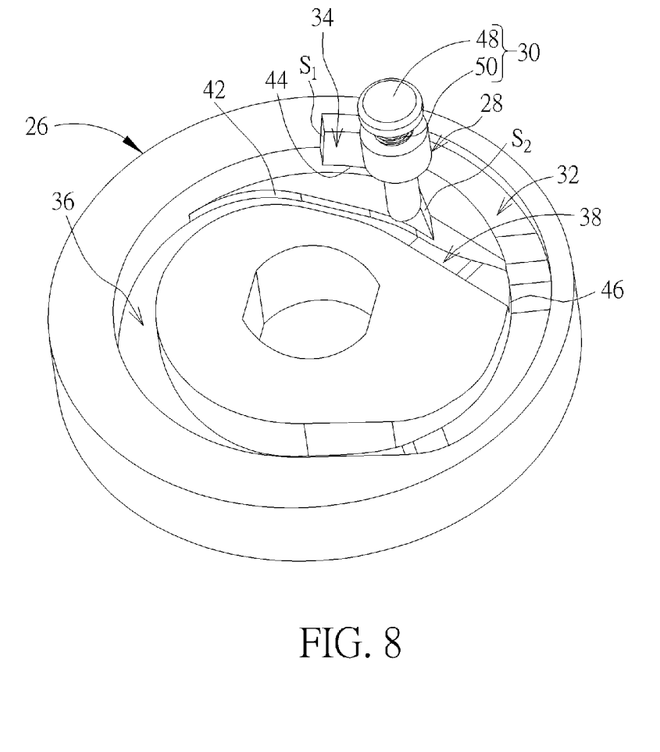
FIG. 8 is an enlarged diagram of the pin in FIG. 7 abutting against a second stopping end surface of the transition rail.
Figure 9:
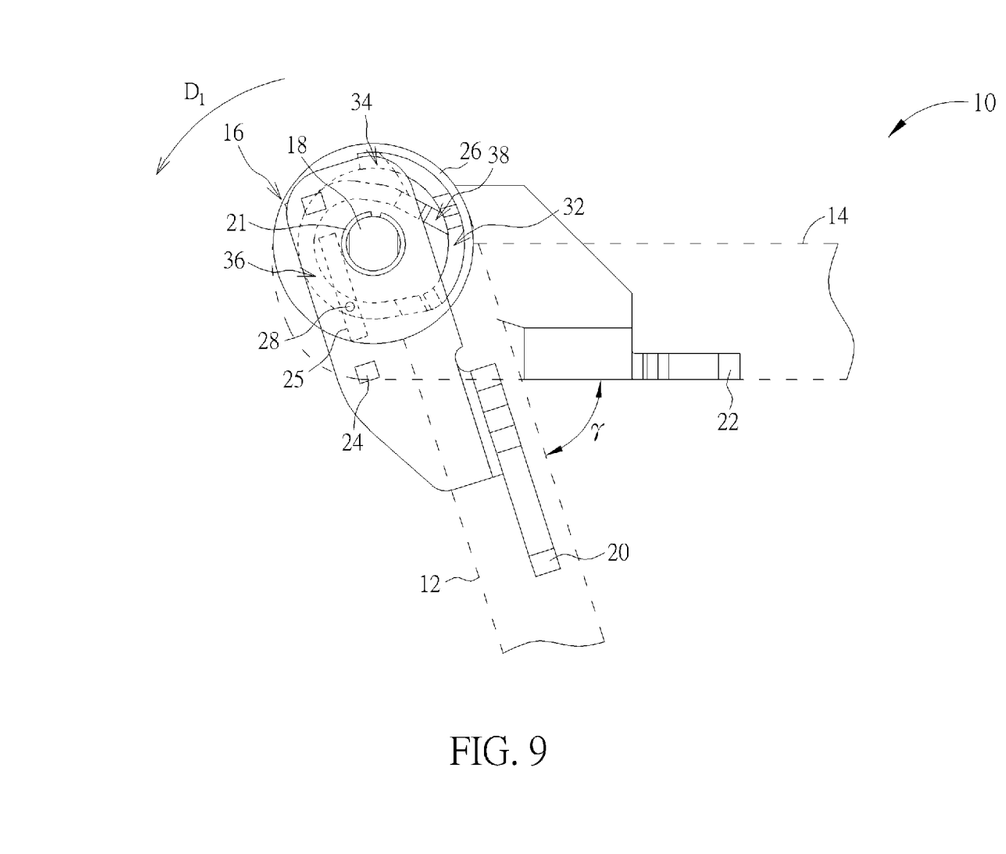
FIG. 9 is a side view of the first body in FIG. 7 rotating in the first rotating direction to make the pin move to a second arc-shaped rail.
Figure 10:
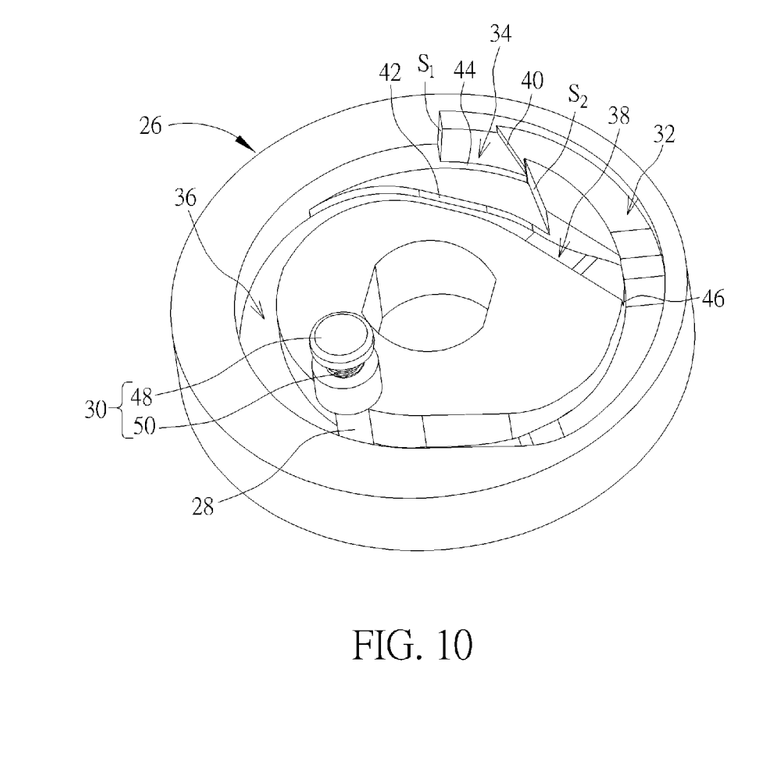
FIG. 10 is an enlarged diagram of the pin in FIG. 9 moving to the second arc-shaped rail.

Please refer to FIG. 5, FIG. 6, FIG. 7, FIG. 8, FIG. 9, and FIG. 10. FIG. 7 is a side view of the first body 12 in FIG. 5 rotating an operating angle in a second rotating direction $D_2$. FIG. 8 is an enlarged diagram of the pin 28 in FIG. 7 abutting against the second stopping end surface $S_2$ of the transition rail 32. FIG. 9 is a side view of the first body 12 in FIG. 7 rotating in the first rotating direction $D_1$ to make the pin 28 move to the second arc-shaped rail 36. FIG. 10 is an enlarged diagram of the pin 28 in FIG. 9 moving to the second arc-shaped rail 36. When the user wants to increase the expanding angle of the first body 12, the user just needs to rotate the first body 12 at an operational angle β (e.g. 15°, but not limited thereto) in the second rotating direction $D_2$ (clockwise as shown in FIG. 7, meaning that the first body 12 rotates reversely after rotating in the first rotating direction $D_1$) from the second position as shown in FIG. 5 to a third position as shown in FIG. 7. In this process, the first connecting member 20 could rotate with the first body 12, and then drives the pin 28 via the limiting frame 24 from the position as shown in FIG. 5 to a position as shown in FIG. 7 to abut against the second stopping end surface $S_2$ of the transition rail 34 along the stopping step structure 40 (at this time, the stopping step structure 40 could simultaneously prevent the pin 28 from moving back to the first arc-shaped rail 32 through the transition rail 34). Via the stopping design (could be selectively omitted for simplifying the rail structural design of the rail base 26), the portable electronic device 10 could remind the user of stopping rotating the first body 12 reversely, so as to prevent excessive reverse-rotation of the first body 12. To be noted, as shown in FIG. 8, after the pin 28 crosses the stopping step structure 44, the spring 50 could provide the elastic force to drive the pin 28 to abut against the transition rail 34 tightly.

After completing the aforesaid operations, the user could keep rotating the first body 12 in the first rotating direction $D_1$ to a desired angle. For example, the user could rotate the first body 12 from the third position as shown in FIG. 7 to a position as shown in FIG. 9 where the first body 12 and the second body 14 has an included angle γ (e.g. 60°, but not limited thereto) in the first rotating direction $D_1$. In this process, the first connecting member 20 could rotate with the first body 12, and then drives the pin 28 via the limiting frame 24 from a position as shown in FIG. 8 to be located at the second arc-shaped rail 36 as shown in FIG. 9 along the transition rail 34 (at this time, as shown in FIG. 10, the spring 50 could provide the elastic force to drive the pin 28 to abut against the second arc-shaped rail 36 tightly after the pin 28 crosses the stopping step structure 42). In such a manner, the hinge mechanism 16 could utilize the friction force generated from rotation of the first connecting member 20 on the shaft 18 to provide a sufficient torque for stopping the first body 12 at the position as shown in FIG. 9, so that the user could make the portable electronic device 10 stand vertically for the subsequent operation (e.g. viewing images displayed by the portable electronic device 10). As for the related description for the other rotation operations of the portable electronic device 10 (e.g. rotating the first body 12 at about 360° relative to the second body 14), it could be reasoned by analogy according to the aforesaid description and omitted herein.

Figure 11:
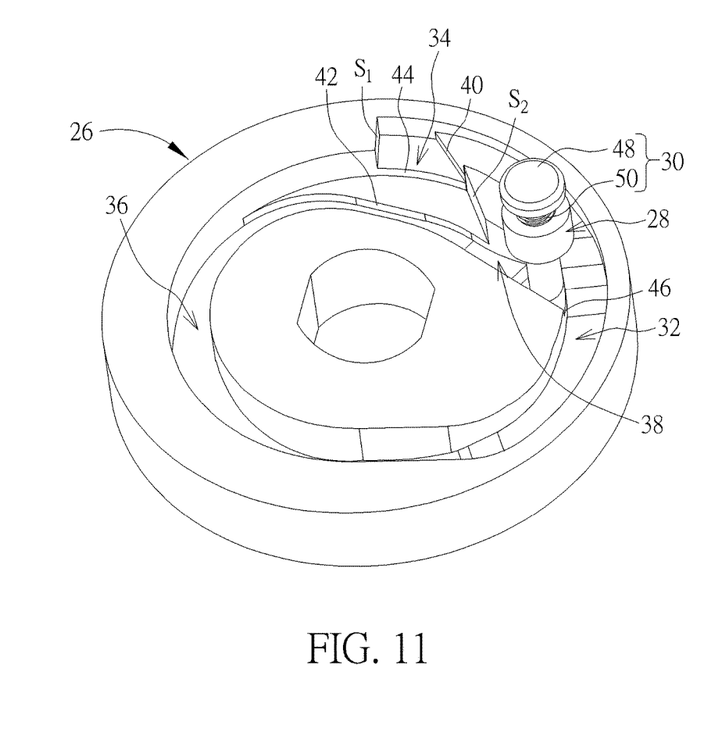
FIG. 11 is an enlarged diagram of the pin in FIG. 10 moving to a third arc-shaped rail.

More detailed description for the folding operation of the portable electronic device 10 is provided as follows in the condition that the first body 12 is located at the position as shown in FIG. 9. Please refer to FIG. 3, FIG. 4, FIG. 9, FIG. 10, and FIG. 11. FIG. 11 is an enlarged diagram of the pin 28 in FIG. 10 moving to the third arc-shaped rail 38. When the user wants to perform the folding operation of the portable electronic device 10, the user just needs to rotate the first body 12 from the position as shown in FIG. 9 to the first position as shown in FIG. 3 in the second rotating direction $D_2$ to be stacked on the second body 12, so that the user could place or carry the portable electronic device 10 conveniently. In the aforesaid process, the first connecting member 20 rotates with the first body 12, and then drives the pin 28 via the limiting frame 24 from the position as shown in FIG. 9 back to the first arc-shaped rail 32 (as shown in FIG. 4) through the third arc-shaped rail 38 (as shown in FIG. 11) along the second arc-shaped rail 36. To be noted, as shown in FIG. 10 and FIG. 11, in the process that the pin 28 moves along the second arc-shaped rail 36 and the third arc-shaped rail 38 sequentially, the stopping step structure 42 could prevent the pin 28 from entering the transition rail 34 through the second arc-shaped rail 36 or the third arc-shaped rail 38. Furthermore, as shown in FIG. 4 and FIG. 6, the stopping step structure 46 could prevent the pin 28 from entering the third arc-shaped rail 38 through the first arc-shaped rail 32 during the pin 28 moves to the transition rail 34 along the first arc-shaped rail 32.

In summary, the present invention adopts the stopping design that the pin abuts against the stopping end surface of the transition rail on the rail base when the first body expands relative to the second body, to prevent the first body from rotating during the user performs the related operation (e.g. a touch operation) of the first body, so as to efficiently solve the prior art problem that the display monitor may be flipped when the user exerts an excessive pressing force on the display monitor. Furthermore, if necessary, the user could keep rotating the first body to a larger expanding angle smoothly after pulling the first body back a little. In such a manner, the portable electronic device provided by the present invention could provide a preferable operation feeling to the user.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A hinge mechanism applied to pivot connection between a first body and a second body, the first body rotating to a first position to be stacked on the second body or to a second position to form an expanding angle cooperatively with the second body via the hinge mechanism, the hinge mechanism comprising:
    a shaft;
    a first connecting member fixed to the first body, the first connecting member rotatably sleeving the shaft;
    a second connecting member fixed to the second body and non-rotatably fixed to the shaft;
    a limiting frame fixed to the first connecting member, the limiting frame rotatably sleeving the shaft, a slot being formed on the limiting frame;
    a rail base non-rotatably fixed to the shaft adjacent to the limiting frame, the rail base having a first arc-shaped rail, a transition rail, a second arc-shaped rail, and a third arc-shaped rail communicated with each other, an end of the first arc-shaped rail being communicated with the transition rail, another end of the first arc-shaped rail being communicated with the second arc-shaped rail and the third arc-shaped rail respectively, the transition rail being communicated with the second arc-shaped rail and the third arc-shaped rail respectively, a first stopping step structure being formed at a position where the transition rail is communicated with the first arc-shaped rail;
    a pin movably disposed through the slot, an end of the pin moving in the first arc-shaped rail, the transition rail, the second arc-shaped rail, or the third arc-shaped rail when the limiting frame rotates relative to the rail base; and
    an elastic member connected to the pin, the elastic member abutting against the first connecting member for providing an elastic force to keep the end of the pin abutting against the first arc-shaped rail, the transition rail, the second arc-shaped rail, or the third arc-shaped rail when the end of the pin moves;
    wherein when the first body rotates the expanding angle from the first position to the second position in a first rotating direction, the pin moves to the transition rail along the first arc-shaped rail and abuts against a first stopping end surface of the transition rail;
    when the first body rotates an operating angle from the second position to a third position in a second rotating direction opposite to the first rotating direction, the pin moves toward the second arc-shaped rail along the first stopping step structure;
    when the first body rotates from the third position in the first rotating direction, the pin moves to the second arc-shaped rail along the transition rail;
    when the first body rotates back to the first position in the second rotation direction to be stacked on the second body, the pin moves from the second arc-shaped rail back to the first arc-shaped rail through the third arc-shaped rail.

2. The hinge mechanism of claim 1, wherein the elastic member comprises an abutting pin and a spring, the abutting pin has a rod portion and a head portion, the head portion abuts against the first connecting member, and the spring sleeves the rod portion and abuts against the head portion and the pin for providing the elastic force.

3. The hinge mechanism of claim 1, wherein a second stopping step structure is formed at a position where the transition rail is communicated with the second arc-shaped rail and the third arc-shaped rail for stopping the pin from moving back to the transition rail through the second arc-shaped rail or the third arc-shaped rail.

4. The hinge mechanism of claim 1, wherein the transition rail further has a second stopping end surface, and when the first body rotates the operating angle from the second position to the third position in the second rotating direction, the pin moves to abut against the second stopping end surface of the transition rail along the first stopping step structure.

5. The hinge mechanism of claim 4, wherein a second stopping step structure is formed between the first stopping end surface and the second stopping end surface of the transition rail, so that the pin enters the second arc-shaped rail along the second stopping step structure during the first body rotates from the third position in the first rotating direction.

6. The hinge mechanism of claim 1, wherein a third stopping step structure is formed at a position where the third arc-shaped rail is communicated with the first arc-shaped rail, for stopping the pin from moving back to the third arc-shaped rail through the first arc-shaped rail.

7. A portable electronic device comprising:
    a first body;
    a second body; and
    a hinge mechanism pivoted to the first body and the second body, for making the first body rotate to a first position to be stacked on the second body or to a second position to form an expanding angle cooperatively with the second body, the hinge mechanism comprising:
        a shaft;
        a first connecting member fixed to the first body, the first connecting member rotatably sleeving the shaft;
        a second connecting member fixed to the second body and non-rotatably fixed to the shaft;
        a limiting frame fixed to the first connecting member, the limiting frame rotatably sleeving the shaft, a slot being formed on the limiting frame;
        a rail base non-rotatably fixed to the shaft adjacent to the limiting frame, the rail base having a first arc-shaped rail, a transition rail, a second arc-shaped rail, and a third arc-shaped rail communicated with each other, an end of the first arc-shaped rail being communicated with the transition rail, another end of the first arc-shaped rail being communicated with the second arc-shaped rail and the third arc-shaped rail respectively, the transition rail being communicated with the second arc-shaped rail and the third arc-shaped rail respectively, a first stopping step structure being formed at a position where the transition rail is communicated with the first arc-shaped rail;

a pin movably disposed through the slot, an end of the pin moving in the first arc-shaped rail, the transition rail, the second arc-shaped rail, or the third arc-shaped rail when the limiting frame rotates relative to the rail base; and an elastic member connected to the pin, the elastic member abutting against the first connecting member for providing an elastic force to keep the end of the pin abutting against the first arc-shaped rail, the transition rail, the second arc-shaped rail, or the third arc-shaped rail when the end of the pin moves;

wherein when the first body rotates the expanding angle from the first position to the second position in a first rotating direction, the pin moves to the transition rail along the first arc-shaped rail and abuts against a first stopping end surface of the transition rail;

when the first body rotates an operating angle from the second position to a third position in a second rotating direction opposite to the first rotating direction, the pin moves toward the second arc-shaped rail along the first stopping step structure;

when the first body rotates from the third position in the first rotating direction, the pin moves to the second arc-shaped rail along the transition rail;

when the first body rotates back to the first position in the second rotation direction to be stacked on the second body, the pin moves from the second arc-shaped rail back to the first arc-shaped rail through the third arc-shaped rail.

8. The portable electronic device of claim 7, wherein the elastic member comprises an abutting pin and a spring, the abutting pin has a rod portion and a head portion, the head portion abuts against the first connecting member, and the spring sleeves the rod portion and abuts against the head portion and the pin for providing the elastic force.

9. The portable electronic device of claim 7, wherein a second stopping step structure is formed at a position where the transition rail is communicated with the second arc-shaped rail and the third arc-shaped rail for stopping the pin from moving back to the transition rail through the second arc-shaped rail or the third arc-shaped rail.

10. The portable electronic device of claim 7, wherein the transition rail further has a second stopping end surface, and when the first body rotates the operating angle from the second position to the third position in the second rotating direction, the pin moves to abut against the second stopping end surface of the transition rail along the first stopping step structure.

11. The portable electronic device of claim 10, wherein a second stopping step structure is formed between the first stopping end surface and the second stopping end surface of the transition rail, so that the pin enters the second arc-shaped rail along the second stopping step structure during the first body rotates from the third position in the first rotating direction.

12. The portable electronic device of claim 7, wherein a third stopping step structure is formed at a position where the third arc-shaped rail is communicated with the first arc-shaped rail, for stopping the pin from moving back to the third arc-shaped rail through the first arc-shaped rail.

* * * * *